United States Patent [19]

Yamazaki et al.

[11] Patent Number: 5,255,077
[45] Date of Patent: Oct. 19, 1993

[54] WHITE BALANCE CONTROL BASED UPON MAGNITUDE OF FLICKER

[75] Inventors: Yasuyuki Yamazaki, Ohmiya; Shigeo Yamagata, Yokohama; Tsutomu Takayama, Kawasaki; Masao Suzuki, Tokyo, all of Japan

[73] Assignee: Canon Kabushiki Kaisha, Tokyo, Japan

[21] Appl. No.: 15,058

[22] Filed: Feb. 8, 1993

Related U.S. Application Data

[63] Continuation of Ser. No. 589,629, Sep. 28, 1990, abandoned.

[30] Foreign Application Priority Data

Sep. 29, 1989 [JP] Japan ................................ 1-255507

[51] Int. Cl.$^5$ .............................................. H04N 9/73
[52] U.S. Cl. ................................................ 358/29
[58] Field of Search ............................ 358/29, 29 C

[56] References Cited

U.S. PATENT DOCUMENTS

| | | | |
|---|---|---|---|
| 4,638,350 | 1/1987 | Kato et al. ..................... | 358/29 C |
| 4,682,210 | 7/1987 | Ikemura et al. ................ | 358/29 |
| 4,689,686 | 8/1987 | Hashimoto et al. ........... | 358/213.26 |
| 4,727,413 | 2/1988 | Miura et al. ................... | 358/29 C |
| 4,811,086 | 3/1989 | Hieda ............................. | 358/29 |
| 4,879,591 | 11/1989 | Takei ............................ | 358/29 |
| 4,918,519 | 4/1990 | Suzuki et al. .................. | 358/29 C |
| 5,010,393 | 4/1991 | Saito ............................. | 358/29 C |

FOREIGN PATENT DOCUMENTS 0207543 1/1987 European Pat. Off. .

OTHER PUBLICATIONS

Patent Abstracts of Japan, Publication No. 01227581.
Patent Abstracts of Japan, Publication No. 63179666.

Primary Examiner—Mark R. Powell
Attorney, Agent, or Firm—Fitzpatrick, Cella, Harper & Scinto

[57] ABSTRACT

Method and apparatus for effecting white balance control in which an image pickup apparatus converts image light into an electrical signal using an image pickup element, and outputs a plurality of color signals corresponding to received light. A still image recorder records the color signals as a still image, and a controller effects a first exposure with the image pickup element before still image recording. Then, the controller forms a white balance control signal by using the first image pickup signals output from the image pickup element in the first exposure. Thereafter, the controller conducts a second exposure to obtained second image pickup signals, and effects white balance control of the second image pickup signals based on the white balance control signals. White balance control is preferably effected by selectively using at least one of (a) information comprising red and blue signals among the outputs from the image pickup element, and (b) information comprising red, green and blue signals according to the amplitude of a detected flicker of the light source.

11 Claims, 8 Drawing Sheets

WHITE BALANCE CONTROL BASED UPON MAGNITUDE OF FLICKER

This application is a continuation of application Ser. No. 07/589,629 filed Sept. 28, 1990, now abandoned.

BACKGROUND OF THE INVENTION

1. Field of the Invention

This invention relates to method and apparatus for effecting improved white balance control in an image pickup apparatus such as an electronic still camera.

2. Description of the Prior Art

Figure 1:
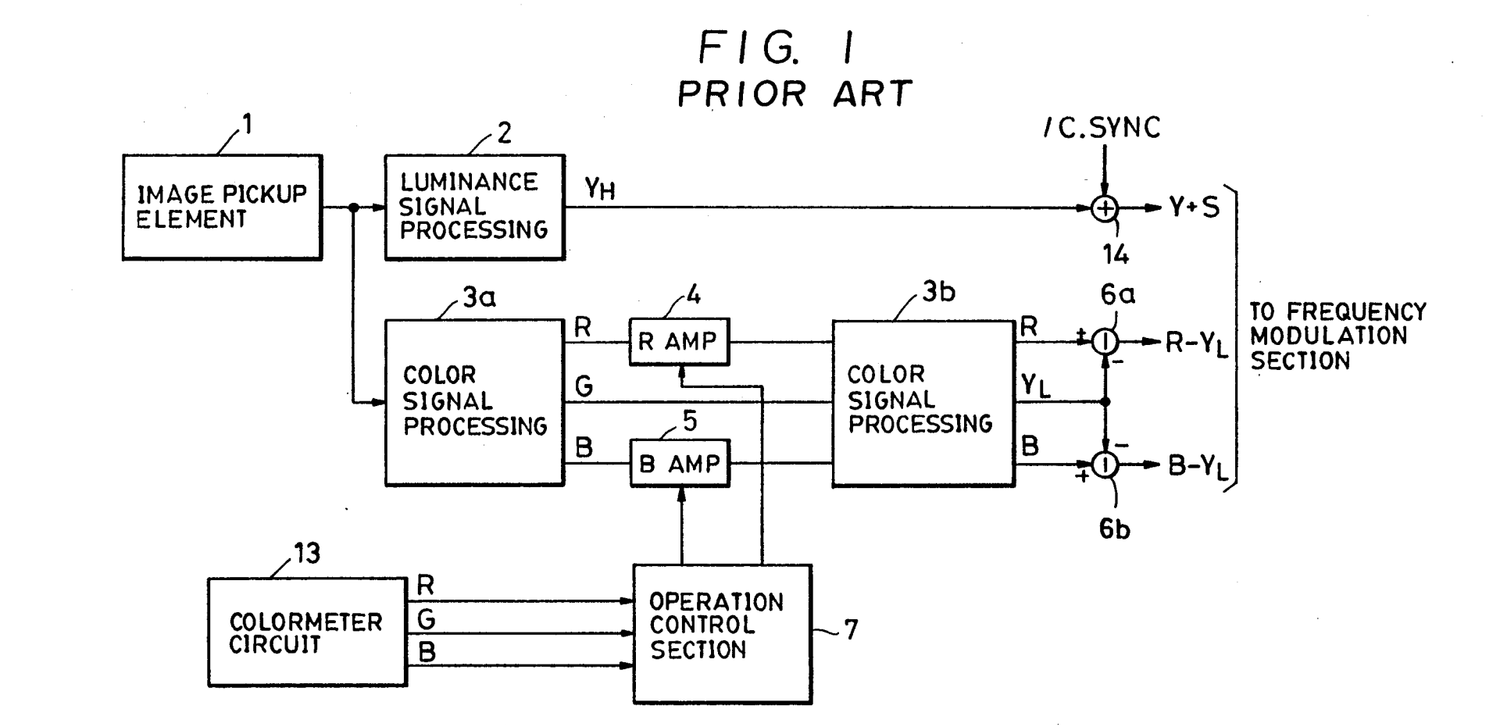
FIG. 1 is a block diagram of a conventional electronic still camera.

Conventional electronic cameras have a construction such as that shown in FIG. 1. Referring to FIG. 1, an image pickup element 1 converts an optical image into an electrical signal, and a luminance signal processing circuit 2 processes the signal output from the image pickup element 1 to form a luminance signal. Color signal processing circuits 3a and 3b form color signals R, B, and $Y_L$, and variable gain amplifiers 4 and 5 effect white balance control of the signals R and B. Subtraction circuits 6a and 6b form color-difference signals $R-Y_L$, $B-Y_L$. A colormeter circuit 13 separates color components (three colors, red, blue and green) from the light source light and converts these components into electrical signals. An operation control section 7 obtains the color temperature of the light source light from outputs R', G' and B' from the colormeter circuit 13, calculates a control voltage for suitable white balancing, and controls the gains of the R amplifier 4 and the B amplifier 5.

However, this conventional electronic still camera requires an expensive colormeter circuit for discriminating the color of the light source light to enable white balance control and therefore has a high production cost.

Moreover, the colormeter circuit and the color filter of the image pickup element have different spectral characteristics and there is a need for adjusting them.

SUMMARY OF THE INVENTION

It is an object of the present invention to solve these problems of the prior art.

It is another object of the present invention to provide a low-cost simple electronic still camera capable of effecting white balance control with improved accuracy.

It is still another object of the present invention to provide an image pickup apparatus capable of optimizing white balance control according to the presence/-non-presence or the magnitude of flicker.

To achieve these objects, the present invention provides, in a first aspect, an electronic still camera comprising: an image pickup means for receiving light from an object for one frame, converting this light into an electrical signal, and outputting a plurality of color signals corresponding to the one frame; a still image recording means for recording the color signals corresponding to the one frame as a still image; and a control means for forming white balance control signals from the color signals by using the output from the image pickup means before still image recording is effected by the still image recording means, and for effecting white balance control of the color signals for the one frame based on the white balance control signals at the time of still image recording.

The present invention provides, in a second aspect, an image pickup apparatus comprising: a flicker detection means for detecting flicker of a light source; a color detection means for forming three primary color signals; and a control means for effecting white balance control by selectively using a white balance control signal based on the three primary color signals and/or a white balance control signal based on two of the three primary color signals according to an output from the flicker detection means.

According to the first aspect of the invention, there is no need for any special photometry sensor element, and the construction of the camera can therefore be simplified.

According to the second aspect of the invention, white balance signals are formed by using two of the three primary colors if the magnitude of flicker is small, or white balance signals are formed by using the three primary colors if the magnitude of flicker is large. Occurrence of an unnatural color can be prevented even if a green lawn or the like is photographed with a non-flickering light source. In a case where the light source is flickering, the influence of green components in a flickering light from the light source can be eliminated, thus optimizing white balance control.

According to a further aspect of the present invention, a photography method using image pickup means and trigger means comprises the steps of forming white balance information by the image pickup means in response to the trigger means; resetting the image pickup means subsequently to the forming step; reading signals from the image pickup means after the exposing step; and controlling the white balance of the signals obtained in the reading step based on the white balance information obtained in the forming step.

DESCRIPTION OF THE PREFERRED EMBODIMENTS

Figure 2A:
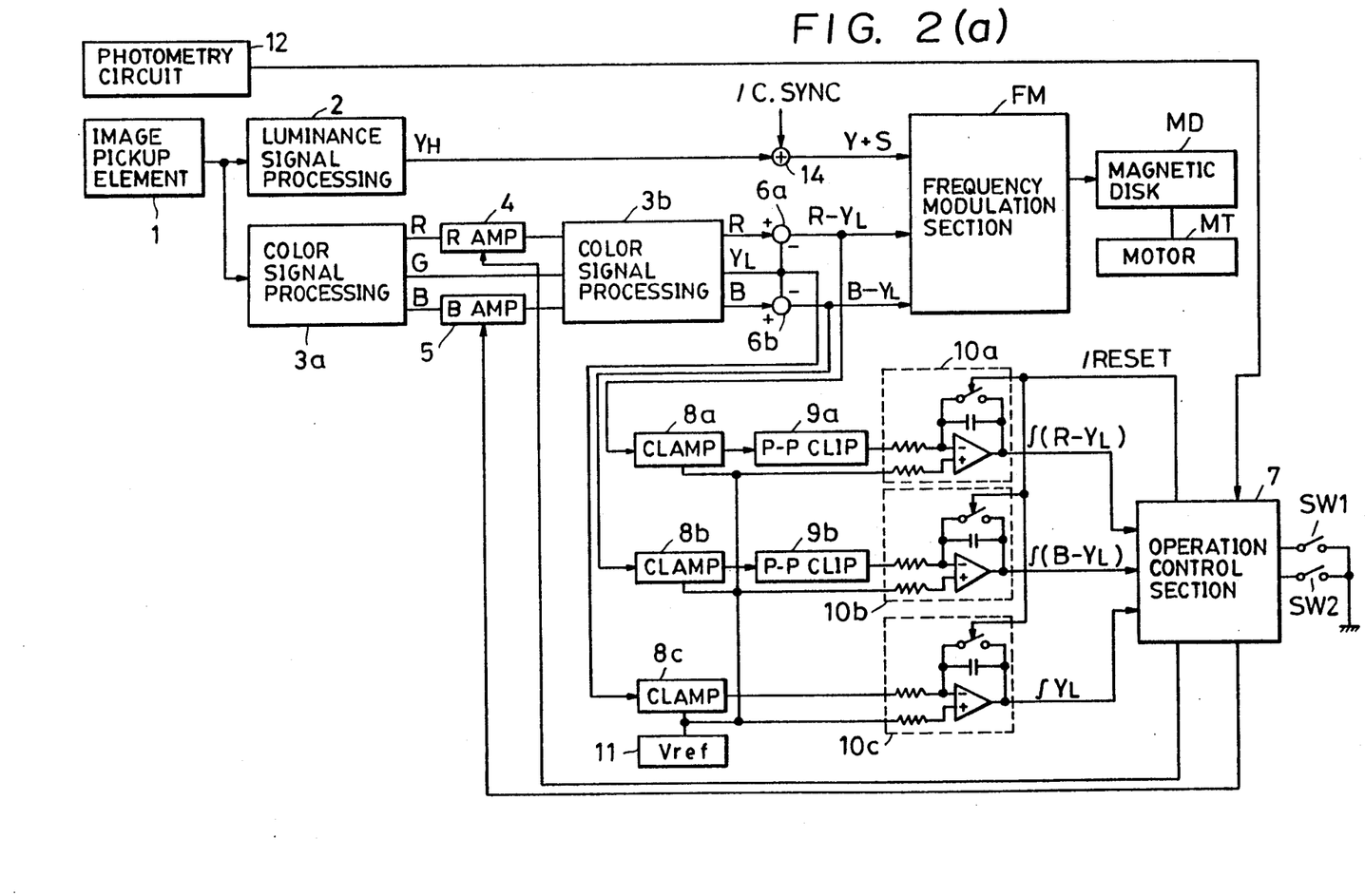
FIG. 2(a) is a block diagram of an electronic still camera which represents a first embodiment of the present invention.

FIG. 2(a) shows a first embodiment of the present invention. Components indicated in FIG. 2 by the same reference characters as those of FIG. 1 have corresponding functions. Clamp circuits 8a, 8b, and 8c serve to clamp supplied signals $R-Y_L$, $B-Y_L$, and $Y_L$ at a voltage determined by a reference voltage source 11. Clip circuits 9a and 9b serve to suppress signal components corresponding to high-chroma portions of the object which may affect the white balance. Integration circuits 10a, 10b, and 10c integrate signals output from the circuits 9a, 9b, and 8c.

A photometry circuit 12 serves to measure the brightness of the object. A frequency modulation section FM, a magnetic disk MD and a disk motor MT are also provided.

Figure 2B:
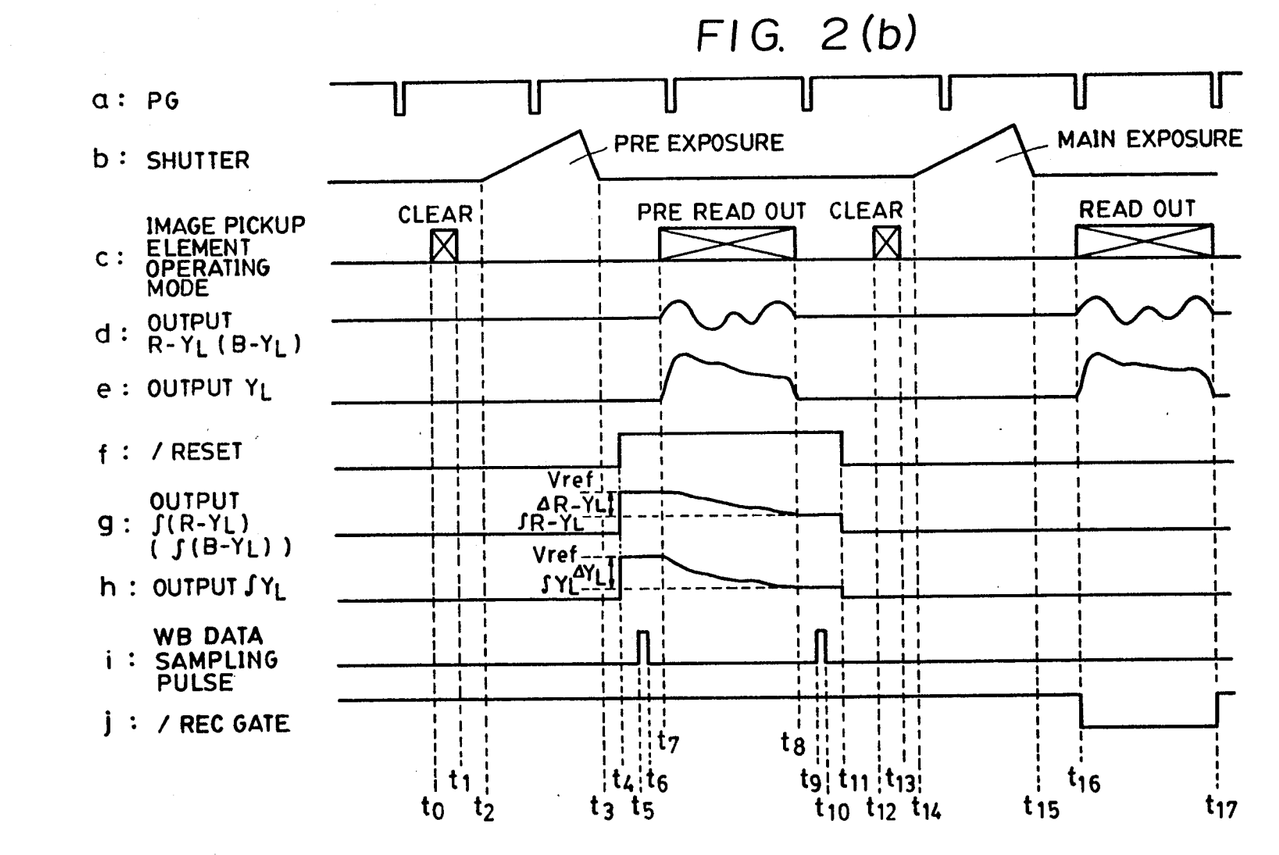
FIG. 2(b) is a timing chart of the first embodiment.
Figure 3:
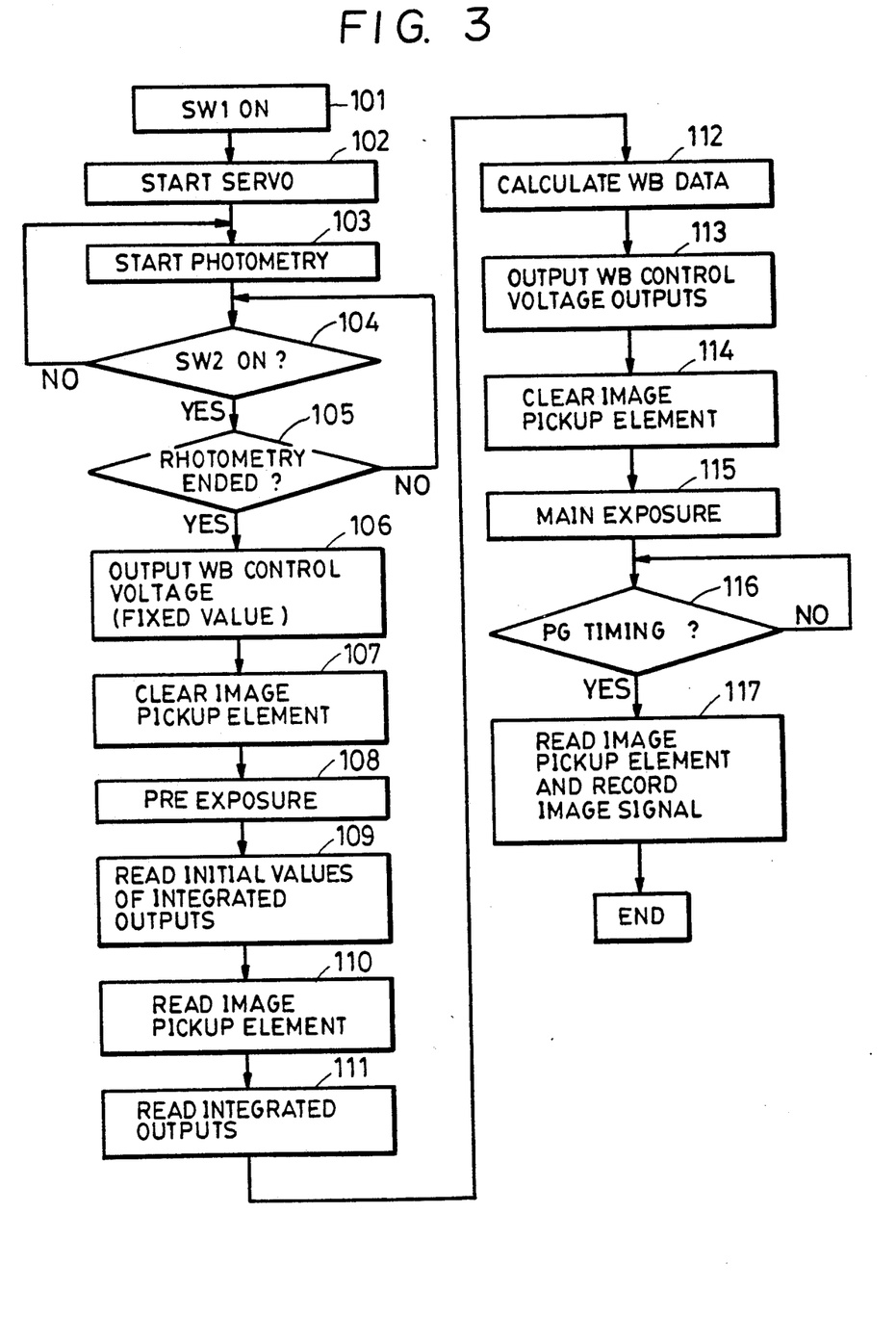
FIG. 3 is a flow chart of the operation of the first embodiment.

The operation of the present invention will be described below with reference to FIGS. 2(a), 2(b) and 3,. FIG. 2(b) and FIG. 3 respectively show a timing chart and a flow chart of the operation of the first embodiment of the present invention.

When a first-step switch SW1 of a two-step release button (not shown) is turned on (101), the magnetic disk motor MT starts servo-controlled operation (102) and the brightness of the object is measured by the photometry circuit 12 (103). The output from the photometry circuit is read by the operation control section 7 based on sampling using a timing asynchronous with the flicker of the illuminating fluorescent lamp, e.g., 23 times in 50 ms. This operation is repeated until a switch SW2 of the two-step release button is turned on. An average value $EV_{AV}$ and a maximum value $EV_{max}$ of the output from the photometry circuit are measured to obtain the magnitude of flicker $EV_F = EV_{max} - EV_{AV}$.

Figure 4:
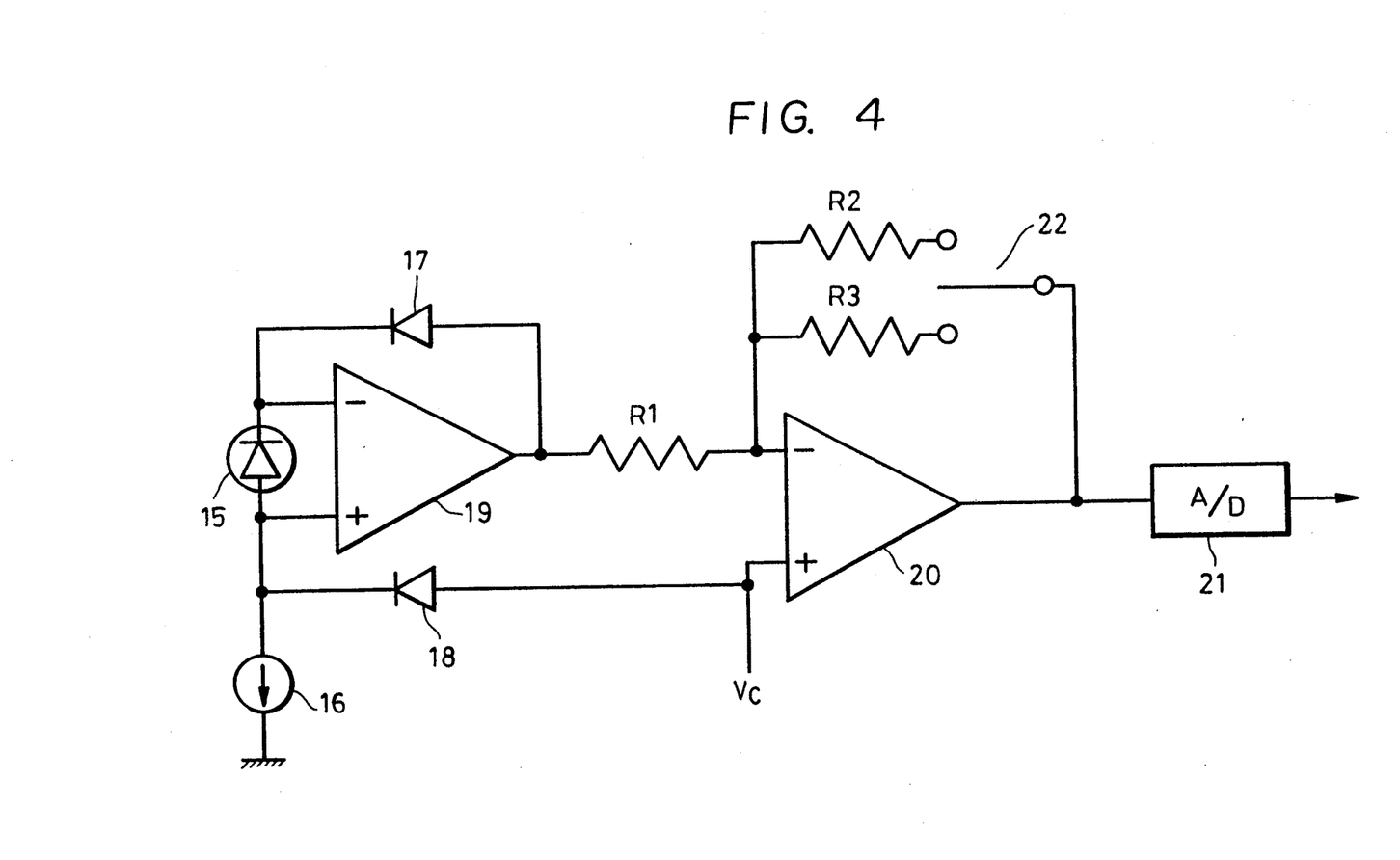
FIG. 4 is a diagram of the photometry circuit of the first embodiment.

FIG. 4 shows the internal construction of the photometry circuit 12.

Figure 5:
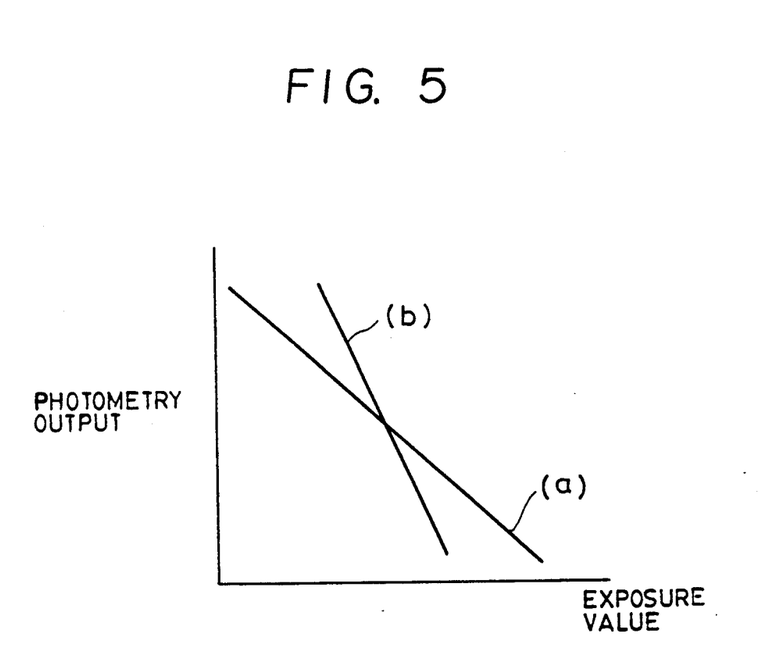
FIG. 5 is a diagram of characteristics of the photometry circuit.

A switch 22 is ordinarily at the position for connection to a resistor R3. Light received by a photodiode 15 is converted into a voltage signal. This voltage signal is compressed by a logarithmic compressor consisting of a diode 17 and an amplifier 19, is amplified by an amplifier 20, and is converted into a digital signal by an A/D converter 21. This digital signal is input into the operation control section 7. Ordinarily, the relationship between the output from the photometry circuit and the brightness of the object (exposure value) is as represented by the line (a) in FIG. 5. This is because it is necessary to effect photometry with respect to a wide range of the exposure value EV. However, the range of photometry of a flickering light source may be restricted since light sources emitting flickering light are, ordinarily, fluorescent lamps, and since the range of brightness of fluorescent lamps is substantially narrow. Accordingly, the switch 22 is at the position for connection to the resistor R3 at the time of ordinary photometry, or it is operated to establish connection to another resistor R2. At this time, the relationship between the resistances of these resistors is R2>R3. The relationship between the exposure value EV and the photometry output is thereby set as represented by the line (b) in FIG. 5. It is thereby possible to detect the magnitude of flicker with accuracy.

Referring again to FIG. 3, when the second-step switch SW2 of the two-step release button is turned on (104), the photometry is terminated (105) and a predetermined fixed value is output from the operation control section 7 as a reference white balance control voltage for first exposure (106). This fixed value is selected so that white balance can be achieved at a central color temperature in the color temperature range in which white balance control is effected. That is, the white balance point is centered to perform white balancing uniformly on both the low color temperature side and the high color temperature side. Thereafter, unnecessary charge accumulated in the image pickup element 1 is cleared in the period of time from $t_0$ to $t_1$ shown in FIG. 2(b) (107), and the shutter is opened at the time $t_2$ to effect a first exposure for a period of time (108). This exposure time and the aperture for this exposure are previously determined based on the above-mentioned photometry result $EV_{AV}$. The first exposure is terminated at $t_3$, and a pulse /RESET sent to the integration circuits 10a, 10b, and 10c is thereafter set to a high level at $t_4$ as indicated by the waveform f of FIG. 2(b) to start an integration operation. Initial values of integration outputs are read by sampling to the operation control section 7 in the period of time from $t_5$ to $t_6$ (109). At the time $t_7$, reading of signal charge accumulated in the image pickup element 1 during the first exposure is started (110). The read signal is converted into signals R, G, and B by a color signal processing circuit 3a as in the case of the conventional apparatus. The signals R and B are amplified by the white balance amplifiers 4 and 5 at gains determined by the control voltage previously set in step 106, and the color signal processing circuit 3b forms signals R, B, and $Y_L$ from these signals, and three signals $R-Y_L$, $B-Y_L$, and $Y_L$ are obtained by the subtraction circuits 6a and 6b. These signals are clamped at the voltage determined by the reference voltage source 11 by the clamp circuits 8a, 8b, and 8c. Signal components of the color difference signals $R-Y_L$ and $B-Y_L$ corresponding to high-chroma portions are clipped by the p-p clip circuits 9a and 9b to eliminate the influence of the high-chroma portions. The clip levels of the clip circuits 9a and 9b are determined within the ranges of the color signal levels which change according to the light source color in the color temperature range in which white balance control is effected. It is thereby possible to prevent over-correction of white balance at color temperatures out of the control range. Outputs from the circuits 9a, 9b, and 8c are respectively integrated by the integration circuits 10a, 10b, and 10c to obtain integrated values $\int(R-Y_L)$, $\int(B=Y_L)$, and $\int Y_L$. The obtained integrated values are read to the operation control section 7 in the period of time from $t_9$ $t_{10}$ (111). The differences Ex between the values read in step 109 and the values read in step 111 are used as integrated values of the respective signals.

Figure 6:
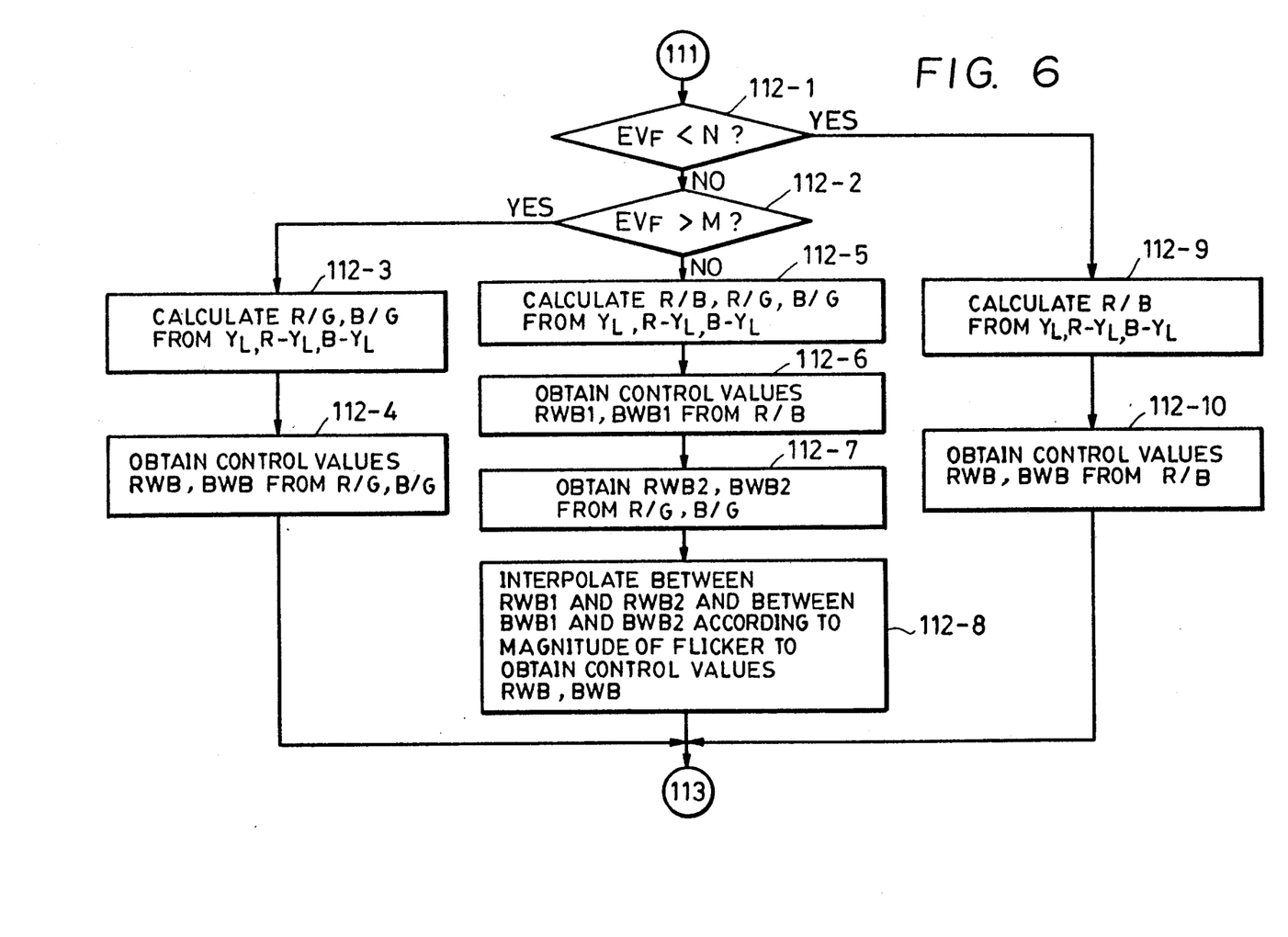
FIG. 6 is a flow chart of details of an important part of the flow chart shown in FIG. 3.

The operation control section 7 calculates white balance control values from the read integrated values (112). FIG. 6 shows a flow chart of this calculation.

The process of calculation of white balance control values will now be described below with reference to FIG. 6.

First, it is determined that the light source is not any fluorescent lamp if the magnitude of flicker $EV_F$ of the photometry value calculated as described above is smaller than a prescribed value N (112-1), and R/B is calculated from the integrated values of $Y_L$, $R-Y_L$, and $B-Y_L$ (112-9). Since the color temperature of the light source can be found from the ratio R/B, suitable white balance control values are obtained from the value of R/B and are set as RWB and BWB (112-10).

If the magnitude of flicker $EV_F$ is greater than a prescribed value M, it is determined that the light source is a fluorescent lamp (112-2), and values of R/G and B/G are calculated from the integrated values of $Y_L$, $R-Y_L$, and $B-Y_L$ (112-3). White balance control values for cancelling the green light from the fluorescent lamp are obtained from the values of R/G and B/G and are set as RWB and BWB (112-4).

If the magnitude of flicker $EV_F$ is in the range of $N \leq EV_F \leq M$, it is determined that the light source light is a mixture of fluorescent lamp light and external light. First, in this case, R/B is obtained as in the case of $EV_F < N$ and the corresponding white balance control values are obtained and are set as RWB1 and BWB1 (112-6). Further, R/G and B/G are obtained as in the case of $EV_F > M$, and white balance control values are obtained from the values of R/G and B/G and are set as RWB2 and BWB2 (112-7). The values obtained in these two ways are interpolated according to the magnitude of flicker by the following equations:

$$RWB = \frac{(RWB2 - RWB1) \times EVF}{M} + RWB1$$

$$BWB = \frac{(BWB2 - BWB1) \times EVF}{M} + BWB1$$

The control values RWB and BWB thereby obtained are output from the operation control section 7 (113).

The subsequent part of the operation flow is the same as the recording sequence for ordinary electronic still cameras. That is, unnecessary charge accumulated in the image pickup element is cleared in the period from $t_{12}$ to $t_{13}$ (114), the shutter is opened for the period of time $t_{14}$ to $t_{15}$ according to the above-mentioned Ex to effect a second exposure, thereby accumulating charge in the image pickup element (115). A phase generating signal PG is supplied from the disk motor at the time $t_{16}$ (116). The signal charge accumulated in the image pickup element is read out in synchronism with the signal PG, and a gate /REC (not shown) is opened to record the image signal on the magnetic disk MD (117).

As described above, the first exposure is effected before the second exposure for still image recording, the signals $Y_L$, $R-Y_L$, and $B-Y_L$ obtained by the first exposure are integrated, R, (G) and B are calculated from the integrated values, and white balance control voltages are obtained from R, G and B. It is thereby possible to automatically effect white balance adjustment without using any external colormeter element and, hence, to reduce the cost of the system.

White balance control is effected based on data comprising the signals R and B and/or data comprising the signals R, G, and B according to the presence/non-presence of flicker or the magnitude of flicker. It is therefore possible to eliminate the influence of flicker when the magnitude of flicker is large or the influence of a green lawn or the like when the magnitude of flicker is small.

Figure 7:
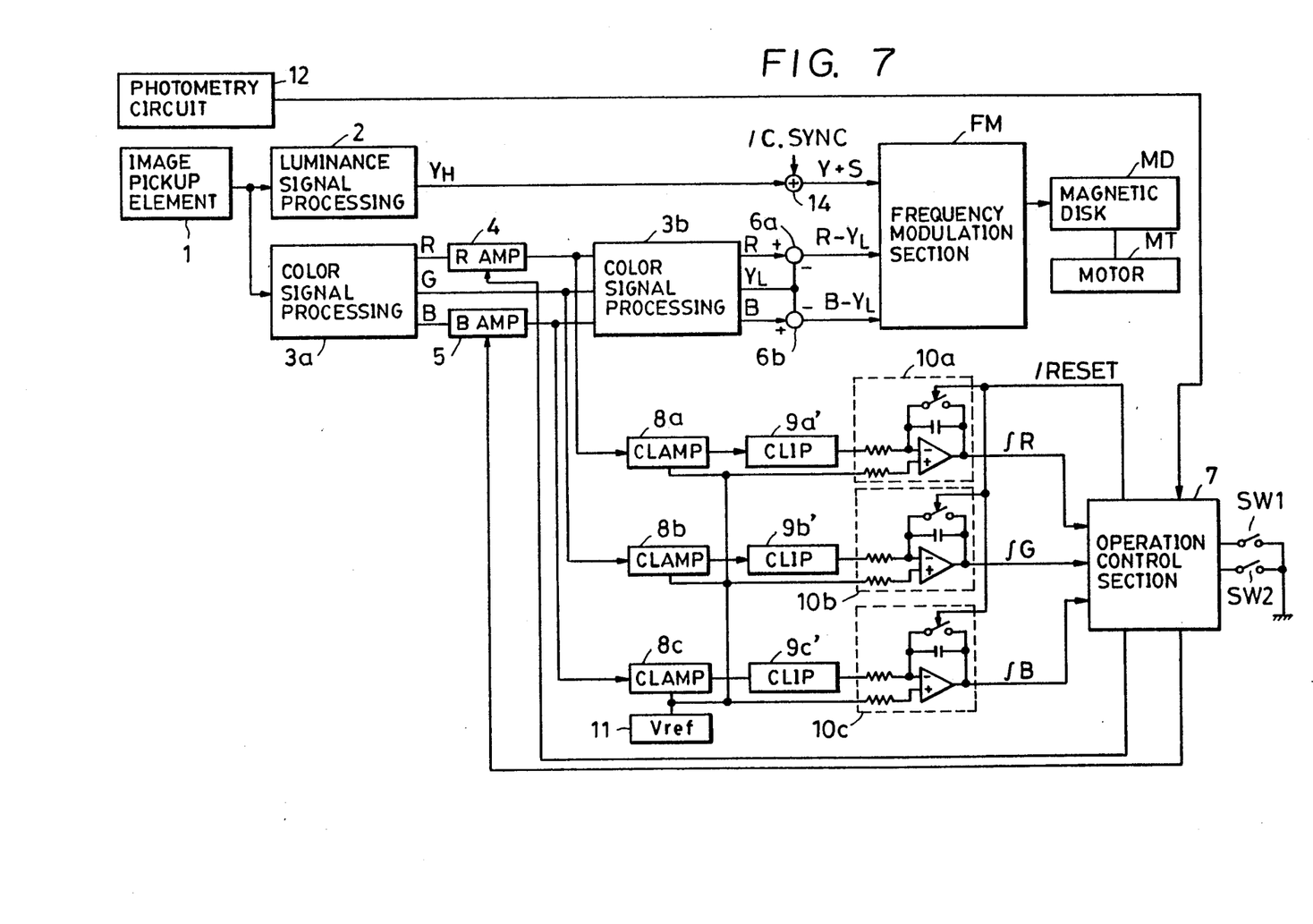
FIG. 7 is a block diagram of an electronic still camera which represents a second embodiment of the present invention.

FIG. 7 shows blocks of an electronic still camera which represents a second embodiment of the present invention. Components indicated in FIG. 7 by the same reference characters as those of FIG. 2(a) have the corresponding functions.

In the first embodiment, the signals $Y_L$, $R-Y_L$, and $B-Y_L$ are used as information for calculating white balance control values. In this embodiment, however, the output G from the color signal processing circuit 3a and the signals R and B output from the R amplifier 4 and the B amplifier 5 are used. The control value sent to the R amplifier 4 and the B amplifier 5 at the time of first exposure is selected so that white balance can be achieved at a central color temperature in the color temperature range in which white balance control is effected, as in the case of the first embodiment.

The signals R, G, and B are respectively clamped by the clamp circuits 8a, 8b, and 8c and are clipped by clip circuits 9a', 9b', and 9c' to eliminate the influence of the high-chroma portions. The clip levels of the clip circuits 9a', 9b' and 9c' are greater than maximums of the color signals which change according to the light source color in the color temperature range in which white balance control is effected. Outputs from the circuits 9a', 9b' and 9c' are respectively integrated by the integration circuits 10a, 10b, and 10c, and the integrated values are read to the operation control section 7. The operation control section 7 calculates white balance control values from the read integrated values to effect white balance control in the same manner as the first embodiment.

This embodiment has the same effects as the first embodiment.

In the above-described embodiments, the shutter is used for both the first exposure and the second exposure. However, the time interval between clearing and reading of the image pickup element may be changed under control to determine the substantial exposure time without using the shutter, if a slight amount of smear can be ignored. The first exposure and/or the second exposure may be controlled in this manner.

The length of time for each of the first exposure and the second exposure may be different from that of one television field period.

According to the arrangement in the first aspect of the present invention, exposure is effected for photometry before still image recording, and white balance control signals are formed from the color signals obtained by the first exposure, thereby enabling automatic white balance control without any special photometry element. As a result, the cost of the system is markedly reduced. In addition, since photometry is effected by using processed color signals, such a means can be used as a color filter of the image pickup element. The control process is therefore independent of changes in the object spectral characteristics and is free of troublesome adjustment. According to the arrangement in the second aspect of the present invention, the primary color signals from which white balance control signals are formed are selected according to the presence/non-presence of flicker, thus always optimizing white balance control.

The individual components shown in outline or designated by blocks in the Drawings are all well-known in the image pickup arts and their specific construction and operation are not critical to the operation or best mode for carrying out the invention.

While the present invention has been described with respect to what is presently considered to be the preferred embodiments, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic still camera comprising:
   image pickup means for receiving light from an object, converting this light into an electrical signal, and outputting a plurality of color image pickup signals corresponding to the received light, and for outputting photometric signals corresponding to a brightness of the object;
   flicker detection means for receiving the photometric signals and detecting therefrom a flicker component of the received light;
   still image recording means for recording the color image pickup signals as a still image; and
   control means for (a) effecting a first exposure with said image pickup means before still image recording is effected by said still image recording means, (b) forming white balance control signals by using first color image pickup signals output from the image pickup means during the first exposure and the flicker component detected by said flicker detection means, (c) determining a magnitude of the detected flicker component, (d) conducting a second exposure to obtain second color image pickup signals, and (e) effecting white balance control of the second color image pickup signals based on the white balance control signals and the determined magnitude of the flicker component.

2. An electronic still camera according to claim 1, wherein said control means includes suppression means for suppressing high-chroma portions of the plurality of color image pickup signals for the formation of the white balance control signals.

3. An electronic still camera according to claim 1, wherein said control means effects white balance control by selectively using at least one of (a) information based on red and blue signals output from said image pickup means, and (b) information based on red, green and blue signals output from said image pickup means according to an amplitude of the detected flicker.

4. An electronic still camera according to claim 1, wherein said control means includes means for controlling the second exposure in accordance with the first color image pickup signals.

5. An electronic still camera according to claim 4, wherein said means for controlling controls a photography time condition.

6. A photography method using image pickup means and trigger means, comprising the steps of:
 forming photometry information corresponding to received light;
 detecting, from the photometry information, a flicker component of the received light;
 determining a magnitude of the detected flicker component;
 forming white balance information from the detected flicker component and the light received by the image pickup means in response to the trigger means;
 resetting the image pickup means subsequently to the forming step;
 exposing the image pickup means after the resetting step;
 reading signals from the image pickup means after the exposing step; and
 controlling the white balance of the signals obtained in the reading step on the basis of the white balance information obtained in the forming step and the determined magnitude of the flicker component.

7. A photography method according to claim 6, further comprising a step of controlling the exposing step on the basis of the photometry information formed.

8. An image pickup apparatus comprising:
 flicker detection means for detecting a flicker of received light;
 color detection means for forming three primary color signals from the received light; and
 control means capable of effecting white balance control of the color signals by selectively using either of (a) a white balance control signal based on the three primary color signals, or (b) a white balance control signal based on two of the three primary color signals according to an output from said flicker detection means.

9. An image pickup apparatus according to claim 8, wherein said color detection means includes image pickup means.

10. An image pickup apparatus according to claim 8, wherein said two of the three primary colors comprise red and blue.

11. An image pickup apparatus according to claim 8, wherein said control means effects white balance control by using the white balance control signal based on the three primary color signals if flicker is detected by said flicker detection means.

* * * * *

UNITED STATES PATENT AND TRADEMARK OFFICE
CERTIFICATE OF CORRECTION

PATENT NO. : 5,255,077

DATED : October 19, 1993

INVENTOR(S) : YASUYUKI YAMAZAKI et al.

It is certified that error appears in the above-identified patent and that said Letters Patent is hereby corrected as shown below:

In The Drawings:
    Sheet 4 of 8; step 105, "RHOTOMETRY" should read --PHOTOMETRY--.

COLUMN 2
    line 31, "step; reading" should read --step; exposing the image pickup means after the resetting step; reading --.

COLUMN 4
    line 36, "$t_9$ $t_{10}$ (111)." should read --$t_9$ to $t_{10}$ (111).--

COLUMN 5
    line 7, "$RWB = \frac{(RWB2-RWB1) \times EVF}{M} + RWB1$"

should read --$RWB = \frac{(RWB2-RWB1) \times EV_F}{M} + RWB1$--; and     line 9, "$BWB = \frac{(BWB2-BWB1) \times EVF}{M} + BWB1$"

should read --$BWB = \frac{(BWB2-BWB1) \times EV_F}{M} + BWB1$--

UNITED STATES PATENT AND TRADEMARK OFFICE
CERTIFICATE OF CORRECTION

PATENT NO. : 5,255,077
DATED : October 19, 1993
INVENTOR(S) : Yasuyuki Yamazaki, et al It is certified that error appears in the above-indentified patent and that said Letters Patent is hereby corrected as shown below:

Column 8, line 40, "flicker." should read --flicker--.

Signed and Sealed this

Sixteenth Day of August, 1994

*Attest:*

BRUCE LEHMAN

*Attesting Officer*      *Commissioner of Patents and Trademarks*